(12) United States Patent
Chen (10) Patent No.: US 7,197,347 B2
(45) Date of Patent: Mar. 27, 2007

(54) METHOD OF CHANGING A FREQUENCY BAND OF A WIRELESS COMMUNICATION DEVICE ACCORDING TO IDENTITY OF A DETACHABLE COVER

(75) Inventor: Liang-Fang Chen, Tai-Nan (TW)

(73) Assignee: BenQ Corporation, Tao-Yuan Hsien (TW)

( * ) Notice: Subject to any disclaimer, the term of this patent is extended or adjusted under 35 U.S.C. 154(b) by 787 days.

(21) Appl. No.: 10/605,075

(22) Filed: Sep. 7, 2003

(65) Prior Publication Data

US 2005/0054391 A1   Mar. 10, 2005

(51) Int. Cl.
*H04M 1/00* (2006.01)

(52) U.S. Cl. .............. 455/575.8; 455/575.1; 455/90.3

(58) Field of Classification Search ............. 455/575.8, 455/575.1, 550.1, 553.1, 558, 90.3
See application file for complete search history.

(56) References Cited

U.S. PATENT DOCUMENTS

| | | | | |
|---|---|---|---|---|
| 5,832,388 | A | * | 11/1998 | Williams et al. ............ 455/557 |
| 6,141,564 | A | * | 10/2000 | Bruner et al. ............... 455/558 |
| 6,771,981 | B1 | * | 8/2004 | Zalewski et al. ........... 455/557 |
| 6,799,057 | B1 | * | 9/2004 | Liverotti ..................... 455/558 |
| 7,079,864 | B2 | * | 7/2006 | Engstrom et al. .......... 455/557 |
| 7,146,196 | B2 | * | 12/2006 | Chen et al. .............. 455/575.1 |
| 2002/0037738 | A1 | * | 3/2002 | Wycherley et al. ......... 455/550 |
| 2002/0098876 | A1 | * | 7/2002 | Engstrom et al. .......... 455/566 |
| 2003/0017839 | A1 | * | 1/2003 | Mager ........................ 455/550 |
| 2003/0125073 | A1 | * | 7/2003 | Tsai et al. ................... 455/552 |
| 2003/0224831 | A1 | * | 12/2003 | Engstrom et al. .......... 455/566 |

* cited by examiner

*Primary Examiner*—Lewis West
(74) *Attorney, Agent, or Firm*—Winston Hsu (57) ABSTRACT

A wireless communication device includes an inner housing and a cover detachably installed on the inner housing, the cover containing an ID module for identifying the cover. A multi-band transceiver is disposed on the inner housing for processing transmitted and received wireless signals in one of a plurality of frequency bands. A detection circuit is disposed on the inner housing for communicating with the ID module of the cover and determining identification of the cover. The wireless communication device also contains a memory electrically connected to the multi-band transceiver and a database stored in the memory for providing a frequency band identifier to the multi-band transceiver according to the identification of the cover provided by the detection circuit for changing the frequency band of the multi-band transceiver.

17 Claims, 7 Drawing Sheets

METHOD OF CHANGING A FREQUENCY BAND OF A WIRELESS COMMUNICATION DEVICE ACCORDING TO IDENTITY OF A DETACHABLE COVER

BACKGROUND OF INVENTION

1. Field of the Invention

The present invention relates to a wireless communication device, and more specifically, to a method of identifying a detachable cover of a wireless communication device and adjusting a frequency band of the wireless communication device according to the identified cover.

2. Description of the Prior Art

Exterior covers are crucial items in the design of wireless communication devices. In addition to aesthetics, the design of the cover also affects durability, ability to withstand damage from electrostatic discharge (ESD), and even wireless performance of the wireless communication device. As a result, all of the major producers of wireless communication devices such as cellular phones put a great deal of effort into design of the cover.

Furthermore, since consumers prefer to change the appearance of their communication devices, it is now common to find communication devices with swappable covers. For example, the Motorola® C330 series of cellular phones has three swappable covers with different shapes and textures that are used to cover the inner housing and circuitry (such as the transceiver) of the cellular phone. With this setup, users can easily and freely change the cover of the cellular phone without concern for the internal hardware or software of the cellular phone.

Figure 1:
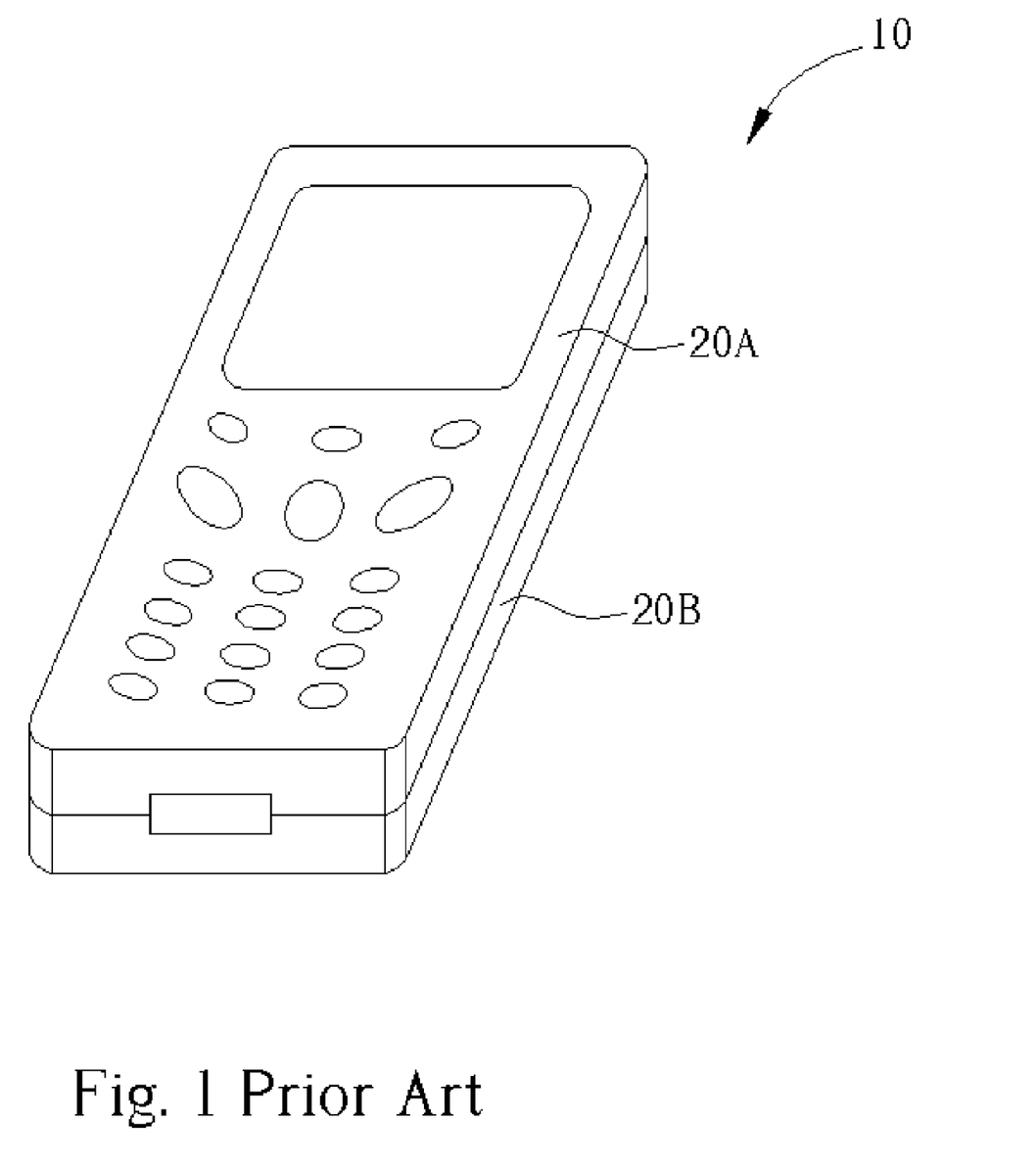
FIG. 1 is a perspective diagram of a wireless communications device according to the prior art.
Figure 2:
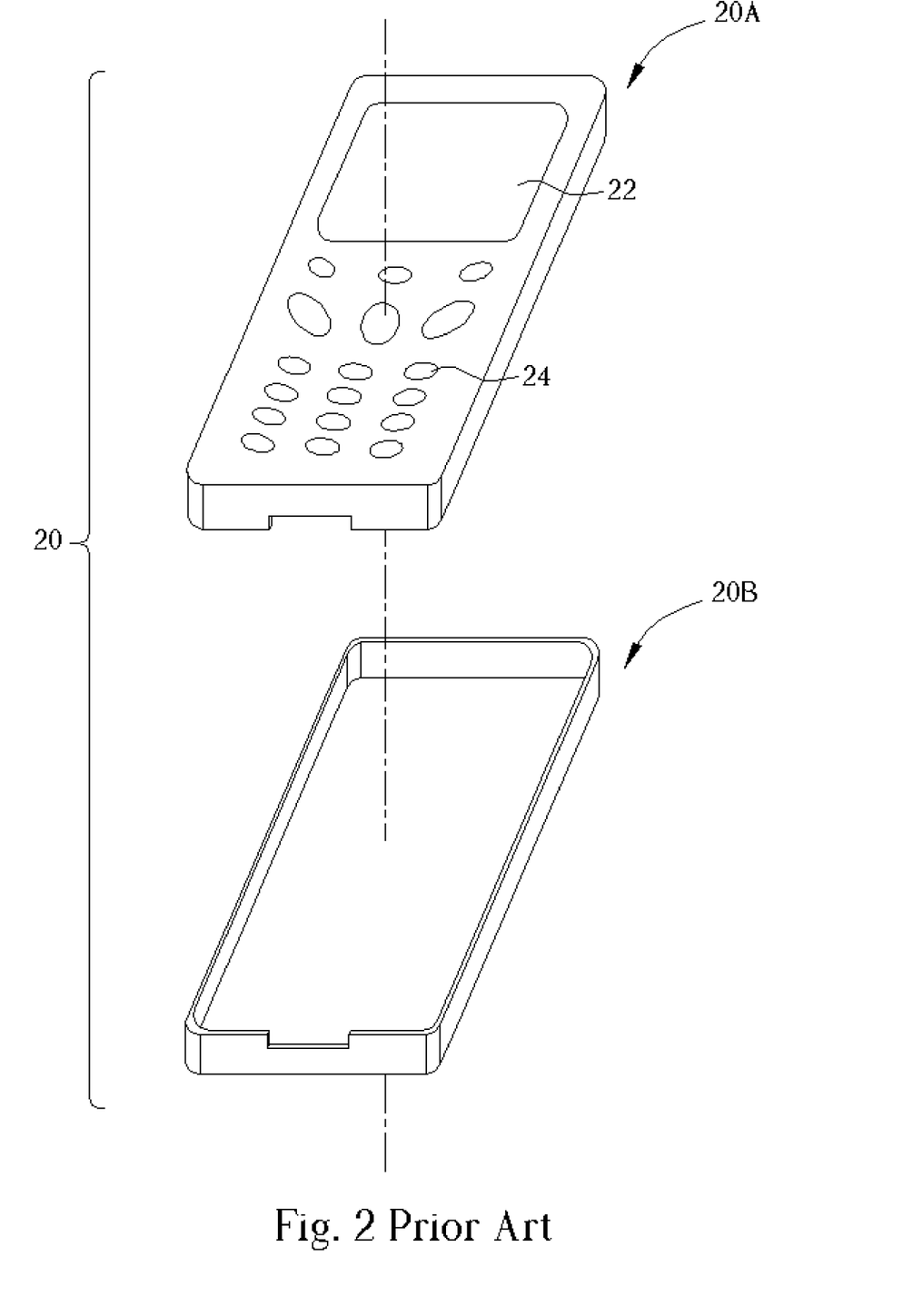
FIG. 2 is a perspective diagram of a front cover and a rear cover of the wireless communications device.

Please refer to FIG. 1 and FIG. 2. FIG. 1 is a perspective diagram of a wireless communication device 10 according to the prior art. FIG. 2 is a perspective diagram of a front cover 20A and a rear cover 20B of the wireless communication device 10. FIG. 1 shows the front cover 20A assembled with the rear cover 20B whereas FIG. 2 shows the front cover 20A and the rear cover 20B separately. For convenience, the front cover 20A and the rear cover 20B will collectively be referred to as a cover 20. The front cover 20A contains a transparent lens 22 for allowing a display screen to be seen through the lens 22. In addition, the front cover 20A contains a plurality of input keys 24 for inputting signals to the wireless communication device 10.

Figure 3:
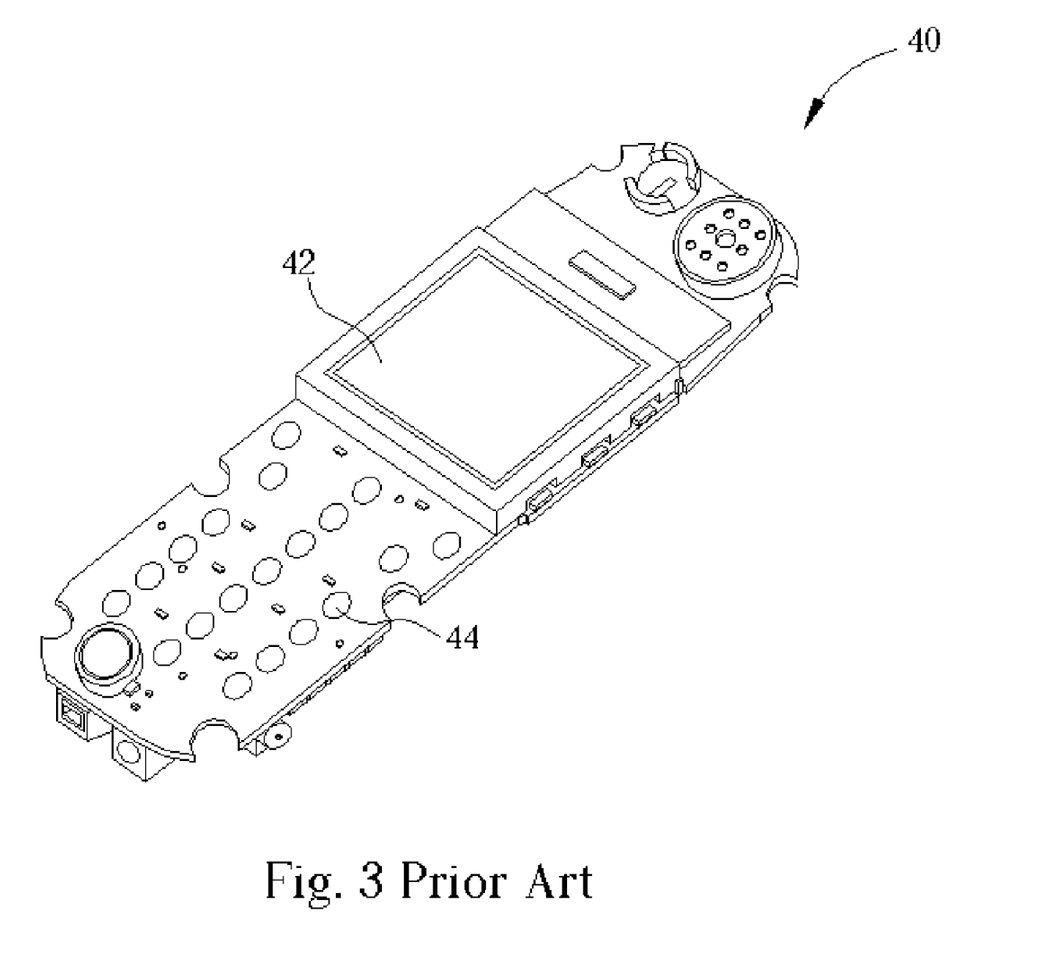
FIG. 3 is a perspective diagram of an inner housing of the wireless communications device according to the prior art.

Please refer to FIG. 3. FIG. 3 is a perspective diagram of an inner housing 40 of the wireless communication device 10. The front cover 20A and the rear cover 20B can be respectively installed on front and rear sides of the inner housing 40, thereby enclosing the inner housing 40 between the front cover 20A and the rear cover 20B. The inner housing 40 contains a display 42 such as an LCD display and a plurality of key sensors 44 for receiving input from the plurality of input keys 24. The key sensors 44 may be made out of a variety of different materials, such as a metal dome keypad sensors.

With many different wireless communication standards found throughout the world, the wireless communication device 10 may contain a multi-band transceiver for allowing the wireless communication device 10 to communicate through more than one frequency band. For instance, multi-band wireless communication devices can be configured for quad-band operation at 850 MHz, 900 MHz, 1800 MHz, and 1900 MHz, or for dual-band or triple-band combinations of these frequencies.

Unfortunately, when a user of the wireless communication device 10 travels between regions using different communication standards, the user will have to manually change the frequency band settings of the wireless communication device 10. This is not only inconvenient, but the user may not have the technical knowledge to change the frequency band without assistance from others.

SUMMARY OF INVENTION

It is therefore a primary objective of the claimed invention to provide a wireless communications device that can detect the identification of a cover, and can automatically change the operating frequency band of the wireless communication device based on the identity of the cover in order to solve the above-mentioned problems.

According to the claimed invention, a wireless communication device includes an inner housing and a cover detachably installed on the inner housing, the cover containing an ID module for identifying the cover. A multi-band transceiver is disposed on the inner housing for processing transmitted and received wireless signals in one of a plurality of frequency bands. A detection circuit is disposed on the inner housing for communicating with the ID module of the cover and determining identification of the cover. The wireless communication device also contains a memory electrically connected to the multi-band transceiver and a database stored in the memory for providing a frequency band identifier to the multi-band transceiver according to the identification of the cover provided by the detection circuit for changing the frequency band of the multi-band transceiver.

It is an advantage of the claimed invention that the wireless communications device is able to detect the identification of the cover and automatically configure the frequency band of the wireless communications device for each cover used.

These and other objectives of the claimed invention will no doubt become obvious to those of ordinary skill in the art after reading the following detailed description of the preferred embodiment, which is illustrated in the various figures and drawings.

DETAILED DESCRIPTION

Figure 4:
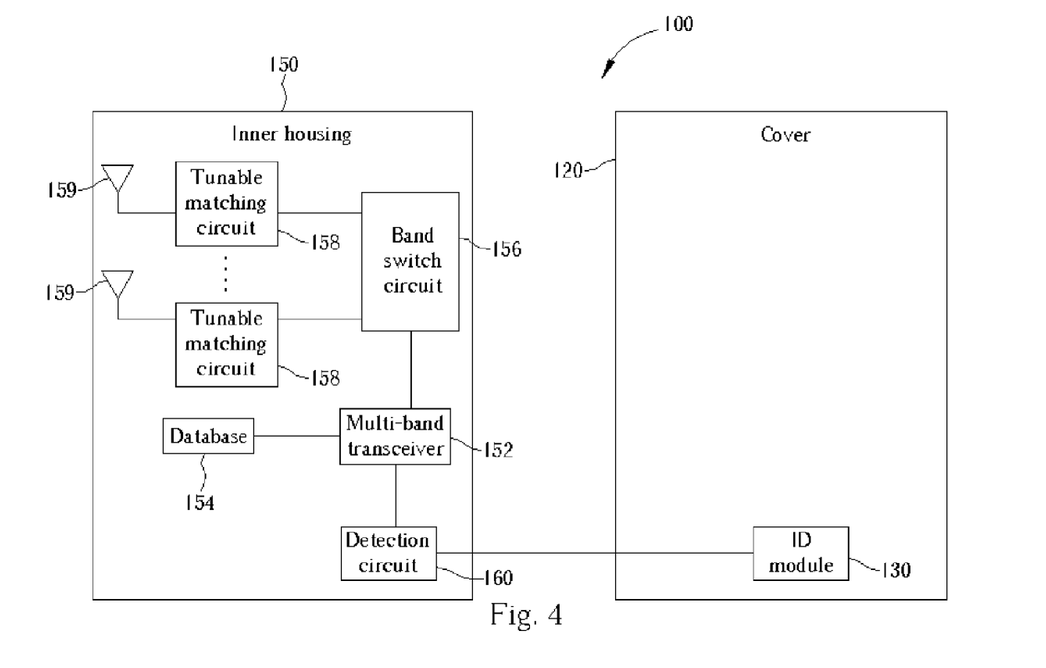
FIG. 4 is a diagram of a wireless communications device according to the present invention.

Please refer to FIG. 4. FIG. 4 is a diagram of a wireless communications device 100 according to the present invention. Like the prior art wireless communications device 10, the present invention wireless communications device 100 contains an inner housing 150 enclosed inside a cover 120.

The cover 120 contains an ID module 130 that uniquely identifies the type of cover 120 being used with the wireless communications device 100. The inner housing 150 contains a multi-band transceiver 152, which is capable of transmitting and receiving wireless signals in multiple frequency bands. To determine which frequency band the multi-band transceiver 152 should use, the inner housing 150 contains a detection circuit 160. The detection circuit 160 reads the identity of the cover 120 from the ID module 130 and transmits the identity of the cover 120 to the multi-band transceiver 152. Based on the identity of the cover 120, the multi-band transceiver 152 searches a database 154 stored in memory for a frequency band identifier and corresponding tuning parameters. For example, if the wireless communications device 100 is a quad-band device, the multi-band transceiver 152 can communicate at a frequency of 850 MHz, 900 MHz, 1800 MHz, or 1900 MHz.

The inner housing 150 contains a plurality of tunable matching circuits 158, each being connected to an antenna 159. Each of the tunable matching circuits 158 can transmit and receive wireless signals in a specific range of frequencies, and the number of tunable matching circuits 158 depends on the number of frequency bands that the wireless communications device 100 is compatible with. Once the multi-band transceiver 152 reads the frequency band identifier from the database 154, the multi-band transceiver 152 controls a band switch circuit 156 to connect to one of the tunable matching circuits 158 corresponding to the selected frequency band. Therefore, by simply changing the cover 120 of the wireless communications device 100, a different frequency band can be used. For example, if a business traveler often travels between a city in Europe and another city in the United States that have different wireless communication standards, the business traveler can simply use a different cover 120 in each location. Therefore, instead of having to remember how to change the frequency band settings of his wireless communications device 100 manually, swapping the cover 120 can accomplish the same task while at the same time changing the outward appearance of the wireless communications device 100.

Figure 5:
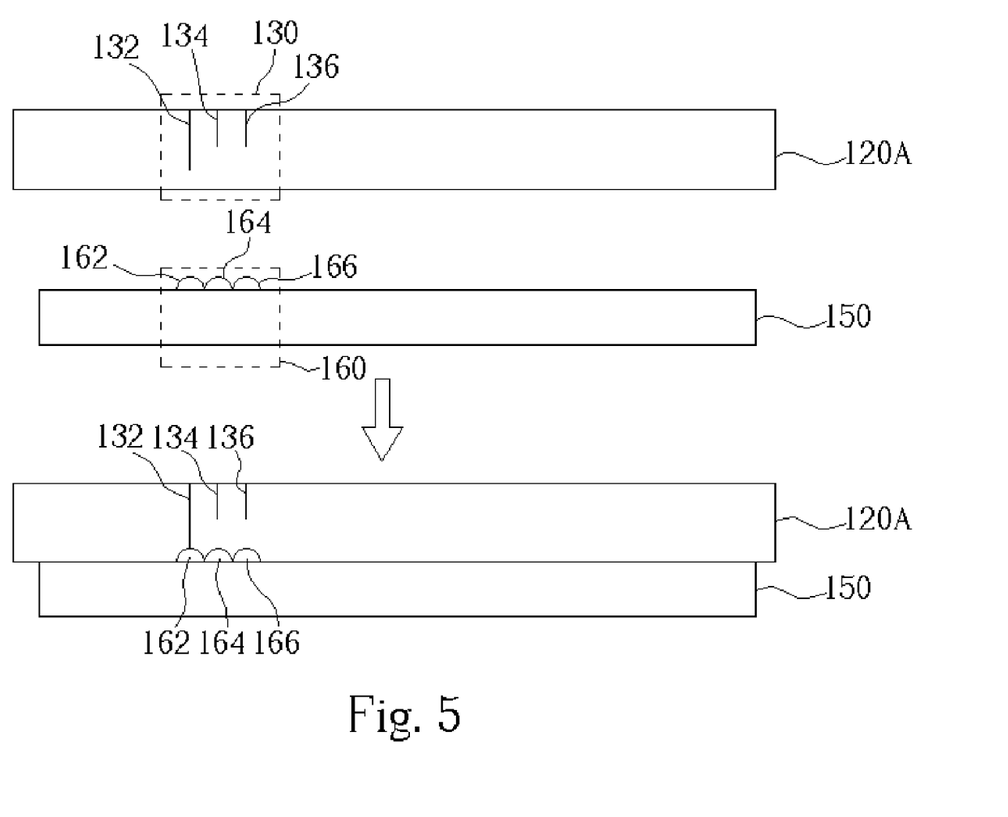
FIG. 5 is a detailed diagram of a detection circuit and an ID module according to the present invention.

Please refer to FIG. 5. FIG. 5 is a detailed diagram of the detection circuit 160 and the ID module 130 according to the present invention. The ID module 130 contains a plurality of contact pins 132, 134, 136 having either a long length or a short length. The detection circuit 160 includes a plurality of metal domes 162, 164, 166 for respectively detecting the length of the contact pins 132, 134, 136. The metal domes 162, 164, 166 are identical to metal domes commonly used as keypad sensors of electronic devices, but the metal domes 162, 164, 166 of the detection circuit 160 have the specific purpose of detecting the length of the contact pins 132, 134, 136. The ID module 130 is preferably formed on an inside surface of a front cover 120A of the cover 120 for contacting the metal domes 162, 164, 166 formed on an upper surface of the inner housing 150.

As shown in FIG. 5, contact pin 132 has a long length, whereas contact pins 134 and 136 both have a short length. Therefore, contact pin 132 will make electrical contact with metal dome 162, whereas contact pins 134 and 136 will not make electrical contact with metal domes 164 and 166. If the length of the contact pins 132, 134, 136 is thought of as a binary code, the binary code for the ID module 130 shown in FIG. 5 could be represented as "100". It can be seen that if N contact pins are used in the ID module 130 (with corresponding metal domes in the detection circuit 160), then one out of a total of $2^N$ unique identities can be given to the cover 120.

Today, many high-end wireless communication devices such as mobile phones have covers made of metal or coated with metallic paint. Because the cover 120 may be a source of electrostatic discharge (ESD), great care must be taken not to damage the circuitry of the inner housing 150 when the contact pins 132, 134, 136 of the ID module 130 contact the metal domes 162, 164, 166 of the detection circuit 160. No matter what kind of material is used for the cover 120, the contact pins 132, 134, 136 and the nearby regions should be isolated from electricity.

Figure 6:
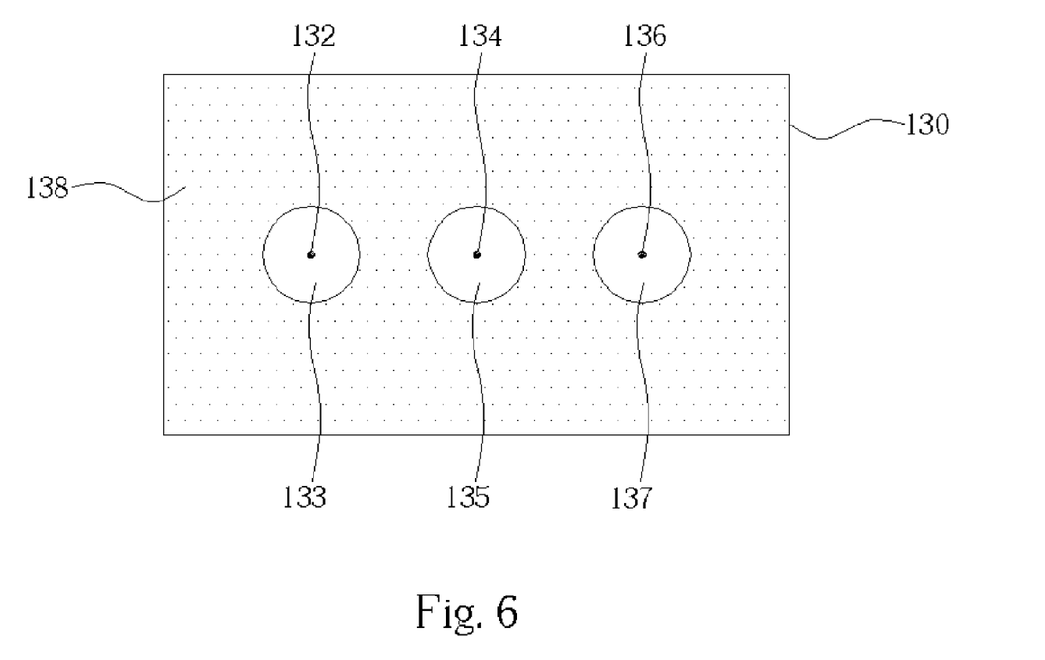
FIG. 6 shows insulating material regions surrounding each contact pin of the ID module.

Please refer to FIG. 6. FIG. 6 shows insulating material regions 133, 135, 137 surrounding each of the contact pins 132, 134, 136 of the ID module 130. A region 138 outside of the insulating material regions 133, 135, 137 may be formed out of insulating or non-insulating material. The key point is the contact pins 132, 134, 136 are surrounded by the insulating material regions 133, 135, 137 to prevent ESD from being transmitted to the inner housing 150 through the contact pins 132, 134, 136.

Figure 7:
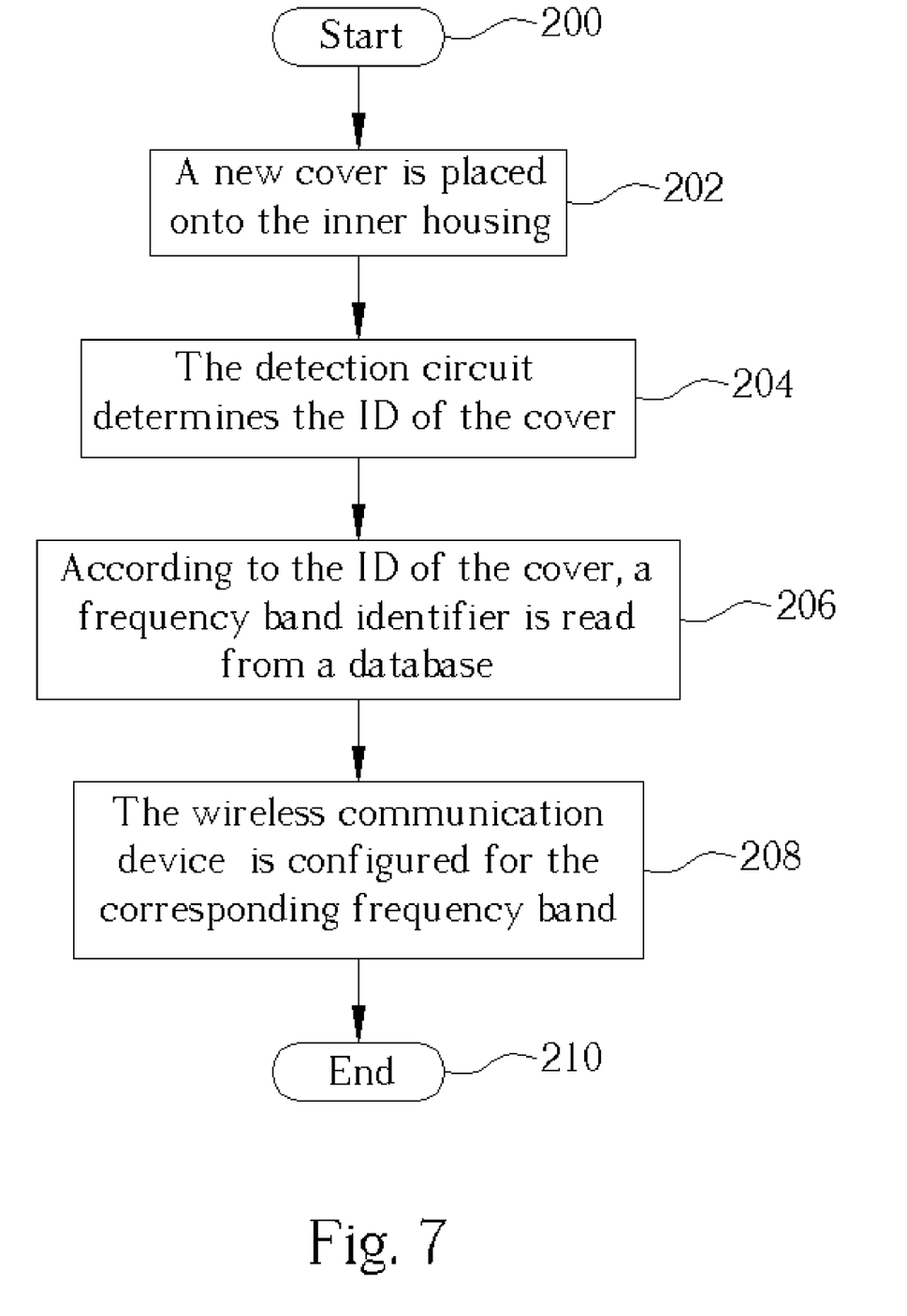
FIG. 7 is a flowchart illustrating the present invention method of identifying the cover and changing the frequency band of the wireless communications device according to the identity of the cover.

Please refer to FIG. 7. FIG. 7 is a flowchart illustrating the present invention method of identifying the cover 120 and changing the frequency band of the wireless communications device 100 according to the identity of the cover 120. Steps contained in the flowchart will be explained below.

Step 200: Start;

Step 202: A new cover 120 is placed onto the inner housing 150 of the wireless communications device 100;

Step 204: The detection circuit 160 determines the identity of the cover 120 from the ID module 130;

Step 206: According to the identity of the cover 120, the multi-band transceiver 152 reads the corresponding frequency band indicator from the database 154;

Step 208: The multi-band transceiver 152 controls the band switch circuit 156 to connect to the tunable matching circuit 158 that corresponds to the selected frequency band; and Step 210: End.

The present invention is well suited for any wireless communications device, such as a mobile phone, which has a detachable cover that can be swapped with other covers. The inner housing 150 can be a printed circuit board (PCB), and all circuitry of the inner housing 150 can be electrically connected through the PCB. In addition to the contact pins and metal nodes respectively used in the ID module 130 and detection circuit 160, other identity detection schemes also fall within the scope of the present invention.

In contrast to the prior art, the present invention wireless communications device is able to detect the identification of the cover and automatically configure the frequency band of the wireless communications device for each cover used. Users can freely swap the covers of wireless communications devices and completely update the frequency band settings of the wireless communications devices without configuring additional settings.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A wireless communication device comprising:
   an inner housing;
   a cover detachably installed on the inner housing, the cover containing an ID module for identifying the cover;

a multi-band transceiver disposed on the inner housing for processing transmitted and received wireless signals in one of a plurality of frequency bands;

a detection circuit disposed on the inner housing for communicating with the ID module of the cover and determining identification of the cover;

a memory electrically connected to the multi-band transceiver; and a database stored in the memory for providing a frequency band identifier to the multi-band transceiver according to the identification of the cover provided by the detection circuit for changing the frequency band of the multi-band transceiver.

2. The wireless communication device of claim 1 further comprising a plurality of matching circuits electrically connected to an antenna, each matching circuit capable of sending and receiving wireless signals through a corresponding frequency band.

3. The wireless communication device of claim 2 further comprising a band switch circuit for electrically connecting the multi-band transceiver to one of the matching circuits according to the frequency band identifier.

4. The wireless communication device of claim 1 wherein the ID module of the cover comprises at least one contact pin having a first or second length for identifying the cover.

5. The wireless communication device of claim 4 wherein the detection circuit of the inner housing comprises at least one metal dome corresponding to the contact pin for detecting the contact of the contact pin, and thereby determining identification of the cover.

6. The wireless communication device of claim 4 wherein the ID module of the cover further comprises an insulating area containing insulating material surrounding each contact pin.

7. The wireless communication device of claim 1 wherein the inner housing comprises a printed circuit board (PCB) on which the multi-band transceiver, detection circuit, and memory are disposed.

8. The wireless communication device of claim 1 being a mobile phone.

9. A method of identifying a detachable cover of a wireless communication device, the wireless communication device comprising an inner housing and a multi-band transceiver disposed on the inner housing, the method comprising:

providing an ID module on the cover for identifying the cover;

detecting the identity of the cover from the ID module; and providing a frequency band identifier to the multi-band transceiver according to the identification of the cover for changing the frequency band of the multi-band transceiver.

10. The method of claim 9 further comprising searching a database for providing the frequency band identifier to the multi-band transceiver according to the identification of the cover.

11. The method of claim 9 further comprising electrically connecting a plurality of matching circuits to an antenna, each matching circuit capable of sending and receiving wireless signals through a corresponding frequency band.

12. The method of claim 11 further comprising electrically connecting the multi-band transceiver to one of the matching circuits according to the frequency band identifier.

13. The method of claim 9 wherein the ID module of the cover comprises at least one contact pin having a first or second length for identifying the cover, and the method further comprises detecting the contact of the contact pin to determine the identification of the cover.

14. The method of claim 13 wherein the inner housing comprises at least one metal dome corresponding to the contact pin for detecting the contact of the contact pin.

15. The method of claim 13 wherein the ID module of the cover further comprises an insulating area containing insulating material surrounding each contact pin.

16. The method of claim 9 wherein the inner housing comprises a printed circuit board (PCB) on which the multi-band transceiver is disposed.

17. The method of claim 9 wherein the wireless communication device is a mobile phone.

* * * * *